(12) United States Patent
Leslie et al.

US008924434B2

(10) Patent No.: US 8,924,434 B2
(45) Date of Patent: Dec. 30, 2014

(54) PROJECT RESOURCE COMPARISON VIEW

(75) Inventors: Victoria Leslie, Roseville, CA (US); Jeffrey Thomas Colvard, Wilkinsburg, PA (US); Brian Cohen, Clayton, CA (US); Darryl Watson, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 98 days.

(21) Appl. No.: 13/538,974

(22) Filed: Jun. 29, 2012

(65) Prior Publication Data

US 2014/0006416 A1 Jan. 2, 2014

(51) Int. Cl.
*G06F 17/30* (2006.01)
*G06Q 10/10* (2012.01)

(52) U.S. Cl.
USPC ............ 707/805; 707/758; 707/947; 705/321

(58) Field of Classification Search
CPC ................... G06F 17/30067; G06F 17/30867; G06Q 10/00
USPC ........... 705/1.1, 320, 321, 323, 328; 707/748, 707/749, 752, 754, 758, 784, 794, 804, 805, 707/821, 944, 947, 951, 48, 999.102; 715/1.1, 320, 321, 323, 328
See application file for complete search history.

(56) References Cited

U.S. PATENT DOCUMENTS

| | | | |
|---|---|---|---|
| 5,983,220 A * | 11/1999 | Schmitt ................................. | 1/1 |
| 7,752,017 B1 | 7/2010 | Leary et al. | |
| 7,991,632 B1 | 8/2011 | Morris et al. | |
| 8,595,149 B1 * | 11/2013 | Obeid ............................. | 705/321 |
| 2002/0046074 A1 * | 4/2002 | Barton ................................. | 705/8 |
| 2003/0236692 A1 | 12/2003 | Hertel-Szabadi | |
| 2005/0004825 A1 | 1/2005 | Ehrler et al. | |
| 2006/0015388 A1 | 1/2006 | Flockhart et al. | |
| 2006/0095420 A1 * | 5/2006 | Ikegami et al. ................... | 707/3 |
| 2011/0040569 A1 * | 2/2011 | Schoenberg .................... | 705/1.1 |
| 2012/0221477 A1 * | 8/2012 | Pande ............................ | 705/321 |
| 2013/0254129 A1 * | 9/2013 | Perlmutter et al. ........... | 705/321 |

FOREIGN PATENT DOCUMENTS

EP  540442 A2  5/1993

OTHER PUBLICATIONS

Author Unknown, "Resource Allocation from the Top & Bottom—You Need Both!" ManagePro, accessed Jan. 12, 2012 from http://www.managepro.com/resourceallocation.html, Copyright 1998-2011, Performance Solutions Technology, LLC; 7 pages.
NetSuite Open Air—obtained at www.openair.com; Apr. 3, 2012; 1 page.
Professional Services Automation Software for Projector PSA—obtained at www.projectorPSA.com; Apr. 3, 2012; 1 page.

* cited by examiner

*Primary Examiner* — Greta Robinson
(74) *Attorney, Agent, or Firm* — Trellis IP Law Group, PC

(57) ABSTRACT

A system and method for facilitating comparing or juxtaposing characteristics or attributes of human resources of an enterprise. The example method includes displaying one or more representations of one or more human resources and providing various user options. A first user option enables a user to add a representation of a human resource to a shortlist. A second user option enables a user to initiate a comparison operation based one or more user selected human resources chosen from the shortlist. In a more specific embodiment, the comparison operation results in display of a comparison view that juxtaposes various attributes of human resources being compared. Example attributes include numbers of keyword matches appearing in human resource profiles, availability scores, locations, billing rates, qualification scores, and so on.

7 Claims, 9 Drawing Sheets

120

| ORACLE | Personalization  Help  Sign Out  John Smith |
|---|---|
| Home▽ Navigator▽ Recent Items▽ Favorites▽ Watchlist▽ | |

Project Resources

Overview / Manage Proj. Res. Requests

Manage Project Resource Requests    ⌐122    [Done]

☐ Search   124        [Advanced] *Saved Searches:* [▽]

*Request Name:* [ ]     *Project Role:* [▽]
*Status:* [Open ▽]     *Resource:* [▽]
*Project Name:* [ ]     *Staffing Owner:* [▽]
*Req. Start Date:* [ ] — [ ]

[Search] [Reset] [Save..]

☐ Search Results      ⌐58
             ☐ Resource Shortlist (Tech Lead 1)

☐ Qual. and Keywords (Tech Lead 1)
128 →
*Request:* Tech Lead 1
*Competencies:* SQL, Java Beans 8.9
*Keywords:* French, Financial
*Languages:* French-Canadian

⌐126

[Submit Req.] [Assign Res.] [Cancel Req.]

Actions▽ View▽ Format▽ | ⊹ ✎ ✖ | ▦ | ▦ ▥Freeze ▦Detach ⇤Wrap

| Name | Matches | Status | Proj. Name | Req. Start | Req. End | Proj. Role | Loc. | Resource |
|---|---|---|---|---|---|---|---|---|
| Consultant-1 | 🔍 | Open | DEF | 7/1/2011 | 12/1/2011 | Consult | LA | Camille A. |
| DBA-1 | 🔍 | Open | ABC | 7/1/2011 | 12/1/2011 | DBA | SF | |
| Tech Lead 1 | 🔍 | Open | ABC | 7/1/2011 | 12/1/2011 | Leader | Chicago | |

| ORACLE | Personalization Help Sign Out John Smith |
|---|---|
| Home▽ Navigator▽ Recent Items▽ Favorites▽ Watchlist▽ | |

Project Resources

| Overview | Manage Proj. Res. Req.s | Proj. Res. Req. Tech Lead1 | Compare: Tech Lead1 |

Compare Resources       166 ↗ Actions △  [ Done ]

Add to Shortlist
Remove from Shortlist
Add to Compare Op.

— 162

☑ Resource Request Details

☑ Resource Information                                                            ⌐164

| View▽ Format▽ | ⌐200 | ⌐168 ⌐76 | ⌐170 ⌐76 | ⌐178 |
|---|---|---|---|---|
| Resource Information | Jones, Fred ☑ | Smith, Mary ☑ | Artois, Camille ☑ | |
| Job Title | Senior Consultant | Senior Consultant | Senior Consultant | |
| Res. Calendar | US Standard | US Standard | US Standard | |
| Proj. Role | Tech Lead ✓ | Tech Lead ✓ | Tech Lead ✓ | |
| Cost Rate (100 USD) | 100 USD ✓ | 50 EUR | 100 USD ✓ | |
| Bill Rate (150 USD) | 150 USD ✓ | 75 EUR | 150 USD ✓ | |
| Overall Match | ▓▓▓▓ 100%  0 50 100 | ▓▓▓ 95%  0 50 100 | ▓▓ 75%  0 50 100 | |
| Qualification Match | ▓▓▓▓ 100%  0 50 100 | ▓▓▓ 95%  0 50 100 | ▓▓ 75%  0 50 100 | |
| Available Capacity | ▓▓▓▓ 100%  0 50 100 | ▓▓▓ 95%  0 50 100 | ▓▓ 75%  0 50 100 | |

⌐174

⌐224
☑ Requested Qualifications

⌐226
☑ Requested Keywords

⌐228
☑ Resource Schedule

| ORACLE | Personalization Help Sign Out John Smith |
|---|---|
| Home▽ Navigator▽ Recent Items▽ Favorites▽ Watchlist▽ | |

Project Resources

Overview | Manage Proj. Res. Req.s | Proj. Res. Req. Tech Lead1 | Compare: Tech Lead1 ✖

Compare Resources     166 ⌒Actions▽  [ Done ]

☑ Resource Request Details ⌒162
☑ Resource Information ⌒164
☑ Requested Qualifications     ⌒224     188

View▽ Format▽ | 🗔 ⌒202 | ⌒182 | ⌒184 | ⌒186

| Qualification (Proficiency) | Jones, Fred | Smith, Mary | Artois, Camille |
|---|---|---|---|
| Java Beans 4.0 (Expert) | Expert ✓ | Expert  176⌒✓ | Expert ✓ |
| SQL 11.1 (Intermediate) | Expert ✓ | Intermediate ✓- | ⊘ |
| XYZ (Intermediate) | Intermediate ✓ | Intermediate ✓ | Superior ✓✢ |
| French: Writing (Medium) | Medium | Medium | Medium |
| ABC (Medium) | Medium | Medium | Medium |

⌒226
☑ Requested Keywords

⌒228
☑ Resource Schedule

FIG. 6

PROJECT RESOURCE COMPARISON VIEW

CROSS REFERENCES TO RELATED APPLICATIONS

This application is related to the following U.S. Patent Applications:

U.S. patent application Ser. No. 13/458,858, entitled PROJECT RESOURCE QUALIFICATION AND KEYWORD SCORING, filed on Apr. 27, 2012, and U.S. patent application Ser. No. 13/405,452, entitled SHORTLISTS FOR RESOURCE REQUESTS, filed on Feb. 27, 2012, both of which are hereby incorporated by reference, as if set forth in full in this document for all purposes.

BACKGROUND

The present application relates to software and more specifically to user interface designs and accompanying methods for facilitating providing insight pertaining to qualities or characteristics of enterprise resources.

Software for facilitating viewing and analyzing characteristics of enterprise resources, such as human resources, are employed in various demanding applications, including Enterprise Resource Planning (ERP), project management, and other resource management applications. Such applications often demand effective features for facilitating making informed selections from among plural available resources to meet the needs of a given project or assignment.

In many enterprise environments, a resource manager must often select and assign human resources to a given position to fulfill needs of a particular project, job, task, and so on. The resource manager may conduct a search for applicable human resources, e.g., employees, prospective employees, contractors, and so on, based on certain criteria applicable to the position to be fulfilled. Conventionally, a resource manager may view resource information pertaining multiple human resource search results to select one or more persons to fulfill a given role or project position.

However, conventional human resource software typically lacks efficient mechanisms to enable project managers to ascertain preferred human resources for certain roles or positions from among plural potentially qualified human resources.

SUMMARY

An example method facilitates comparing or juxtaposing characteristics, such as qualification scores, ratings, locations, roles, availability, and so on, of human resources of an enterprise. The example method includes displaying one or more representations of one or more human resources; providing a first user option to add a representation of a human resource to a shortlist; and providing a second user option to initiate a comparison operation based one or more user selected human resources chosen from the shortlist.

In a specific embodiment, the one or more representations of the one or more human resources includes identifications of human resources in the shortlist, or alternatively, includes a display of one or more human resource cards corresponding to search results derived from a resource request.

The first user option may be implemented, in part, via one or more shortlist selection mechanisms, such as checkboxes, in proximity to each of the one or more cards. A shortlist user interface control, such as a shortlist button, is adapted to enable a user add human resources associated with checked checkboxes to the shortlist.

The second user option may be implemented, in part, via one or more compare selection mechanisms, such as checkboxes, in proximity to a representation of a resource indicated in the shortlist or in proximity to one or more cards. A third user option enables a user to trigger a comparison operation, e.g., via a comparison button, to trigger juxtaposition one or more representations of resources that have been selected via the checkboxes.

Upon user selection of a comparison button or related user interface control a comparison view is displayed. The comparison view juxtaposes one or more indications of one or more characteristics associated with each human resource being compared.

In the specific embodiment, the one or more characteristics may include characteristics different than or in addition to characteristics associated with search criteria of a resource request that yielded search results used to select resources for inclusion in the shortlist.

The one or more characteristics may include, for example, a keyword match score. The one or more indications include an indication, for each human resource being compared, a number of keyword matches occurring in a profile or portion thereof. A fourth user option enables a user to trigger display of a comparison view that juxtaposes proficiency levels associated with each qualification that is associated with a keyword match in a profile of a human resource.

The one or more indications of one or more characteristics may further include an indication of an availability of a human resource over a predetermined time interval. Resource availability for compared resources may be illustrated, in part, via schedules that are graphically depicted via a Gantt chart.

A fifth user option enables a user to associate a shortlist with a resource request or to otherwise change a default association of the shortlist with a resource request. A sixth example user option enables a user to assign a human resource to a position, e.g., to a project role, task, team, group, job, and so on, from a comparison view.

Hence, certain embodiments discussed herein may not only provide user options to take actions pertaining to human resources, but may provide informative and efficient mechanisms for comparing resources based on various attributes, e.g., location, primary project role, cost and bill rates, keyword matches, schedules, and so on.

Conventionally, resource management software lacked streamlined functionality for displaying detailed resource information, initiating comparisons of detailed information, shortlisting resources, and taking actions pertaining to the resources. Shortcomings with previous resource management software and accompanying methods are addressed by various embodiments discussed herein.

A further understanding of the nature and the advantages of particular embodiments disclosed herein may be realized by reference of the remaining portions of the specification and the attached drawings.

BRIEF DESCRIPTION OF THE DRAWINGS

FIG. 3 is a second example user interface display screen adapted to facilitate managing resource requests and viewing shortlists associated therewith.

FIG. 5 is a fourth example user interface display screen illustrating an example comparison that juxtaposes example resource information of various compared resources.

FIG. 6 is a fifth example user interface display screen illustrating an example comparison that juxtaposes qualification ratings pertaining to various example requested resource qualifications.

DETAILED DESCRIPTION OF EMBODIMENTS

Figure 1:
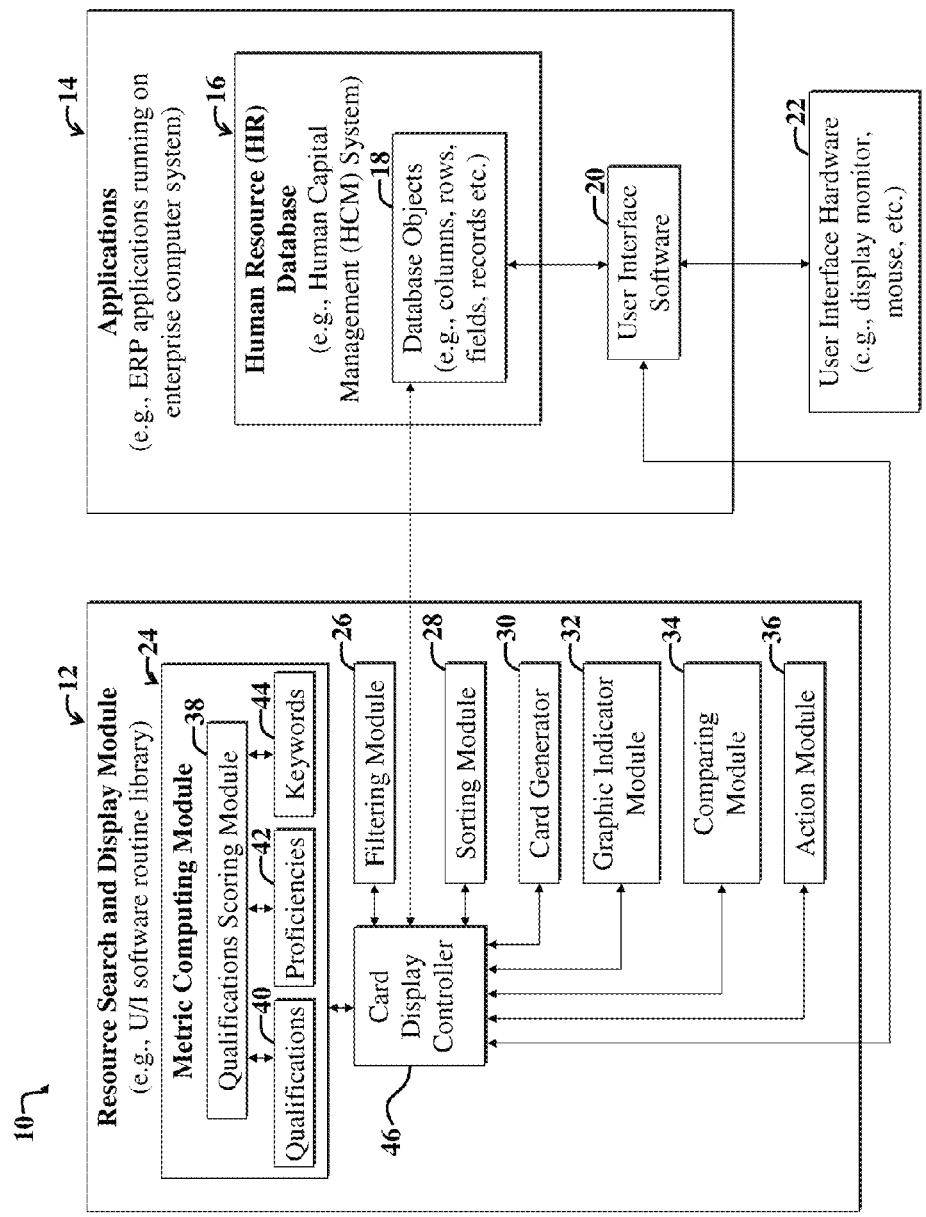
FIG. 1 is a diagram illustrating a first example embodiment of a system for facilitating conducting a resource query and displaying, organizing, and interacting with search results and accompanying scores in response thereto.

Although the description has been described with respect to particular embodiments thereof, these particular embodiments are merely illustrative, and not restrictive.

For example, while the present application is discussed with respect to systems and methods for facilitating access to and manipulation of enterprise data to facilitate informed resource allocation decisions based on comparison operations, embodiments are not limited thereto. For example, any computing environment, such as those employed in universities, governments, and so on, may benefit from use of various embodiments disclosed herein.

In addition, while various embodiments are discussed with respect to user interface display screens suitable for desktop implementations and enterprise computing environments, embodiments are not limited thereto. Various embodiments disclosed herein may be adapted for use with virtually any computer based display, including smart phone displays, tablet displays, and so on.

Furthermore, while various user interface controls, such as buttons, tabs, checkboxes, and so on, are shown, other types of user interface controls may be employed in addition to or instead of such controls, without departing from the scope of the present teachings.

For the purposes of the present discussion, a user interface control may be any displayed element or component of a user interface display screen, which is adapted to enable a user to provide input. Examples of user interface controls include buttons, drop down menus, menu items, hyperlinks, checkboxes, and so on.

Furthermore, while certain embodiments discussed herein illustrate user interface mechanisms for triggering comparison operations from a card view of search results or from a shortlist constructed from a card view, embodiments are not limited thereto. For example, in certain implementations, hand selected resources that do not represent search results associated with a particular resource request, or that represent resources from disparate resource request search results, may be compared via methods discussed herein, without departing from the scope of the present teachings.

For the purposes of the present discussion, a human resource may be any person and accompanying knowledge and capabilities that may provide value to an organization, such as in the form of work or other effort. Examples of human resources include enterprise personnel, i.e., persons associated with an enterprise, such as employees, independent contractors, managers, investors, and so on. Note that various representations, such as cards, of resources may be presented. In such cases, the representations of the resources are also called resources, and vice versa. For example, when a resource is said to be added to a shortlist, in practice, a computer representation (or a link to a computer representation) of the resource is added to the shortlist.

For clarity, certain well-known components, such as hard drives, processors, operating systems, power supplies, and so on, have been omitted from the figures. However, those skilled in the art with access to the present teachings will know which components to implement and how to implement them to meet the needs of a given implementation.

FIG. 1 is a diagram illustrating a first example embodiment of a system 10 for facilitating conducting a resource query and displaying, organizing, and interacting with search results in response thereto. The example system 10 includes a resource search and display module 12 in communication with one or more software applications, such as Enterprise Resource Planning (ERP) software applications 14 (also simply called ERP applications).

The system 10 is considered part of an enterprise computing environment. For the purposes of the present discussion, an enterprise computing environment may be any computing environment used for a business or organization. A computing environment may be any collection of computing resources used to perform one or more tasks involving computer processing. An example enterprise computing environment includes various computing resources distributed across a network and may further include private and shared content on Intranet Web servers, databases, files on local hard discs or file servers, email systems, document management systems, portals, and so on.

For the purposes of the present discussion, ERP software may be any set of computer code that is adapted to facilitate managing resources of an organization. Example resources include Human Resources (HR) (e.g., enterprise personnel), financial resources, assets, employees, and so on, of an enterprise. The terms "ERP software" and "ERP application" may be employed interchangeably herein. However, an ERP application may include one or more ERP software modules or components, such as user interface software modules or components.

Enterprise software applications, such as Customer Relationship Management (CRM), Business Intelligence (BI), Enterprise Resource Planning (ERP), and project management software, often include databases with various database objects, also called data objects or entities. A database object, also called a computing object herein, may be any collection of data, such as data pertaining to a particular financial account, asset, employee, contact, and so on. Examples of computing objects include, but are not limited to, records, tables, or other database entities corresponding to accounts receivables, products, employees, customers, business resources, and so on.

The example ERP applications 14 include a Human Resource (HR) database 16, which maintains various database objects 18. The database 16 communicates with user interface software 20, which communicates with user interface hardware 22. The user interface software 20 further communicates with the resource search and display module 12 via a card display controller 46 included in the resource search and display module 12.

The resource search and display module 12 further includes a metric computing module 24, a results filtering module 26, a results sorting module 28, a card generator 30, a graphic indicator module 32, a card comparing module 34, and an action module 36, all of which communicate with the card display controller 46. The card display controller 46 further communicates with the human resources database 16 and may facilitate conducting searches thereof.

For illustrative purposes, the metric computing module 24 is shown further including a qualification scoring module 38 in communication with a competencies module 40, a proficiencies module 42, and a keywords module 44. Note that the metric computing module 24 may include additional modules and functionality other than that shown. For example, the metric computing module 24 may further including computer code for computing availability scores or other metrics, as discussed more fully below.

In an example operative scenario, a resource manager employs the system 10 to conduct a search of human resources, such as enterprise personnel, whose characteristics, e.g., availability, qualifications, knowledge, experience, and so on, meet a particular set of criteria for a given project, task, or role.

The resource manager employs the user interface hardware 22 and software 20 to enter data (corresponding to search criteria), which characterizes a sought resource. The entered data represents a resource request, also called a resource query. For the purposes of the present discussion, a resource request may be any database query seeking search results that contain data pertaining to a resource of an organization, such as a human resource. The resource request may include, for example, a specification or description of a resource sought to meet one or more needs or requirements of a project or task. In the present example embodiment, enterprise personnel, such as a resource manager, may enter (via the user interface hardware 22 and software 20) a resource request that includes one or more search criteria specifying sought characteristics of a human resource.

Data pertaining to the resource request is sent from the user interface software 20 to the card display controller 46, which conducts a search of the HR database 16. Alternatively, the user interface software 20 conducts the search of the HR database 16 based on the resource request. In either case, a set of one or more results is returned to the card display controller 46. The card display controller 46 then organizes the search results in various cards, i.e., electronic cards, wherein each card corresponds to a database object representing a search result.

For the purposes of the present discussion, a card, also called an electronic card, may be any collection of data and/or graphics presented in a region of a display screen. In the present example embodiment, the region is marked by a rectangular border, as discussed more fully below, but other shapes, such as circles, may be possible. Cards discussed herein may be tiled, cascaded, and so on. Similarly, cards may be characterized by different aspect ratios. For example, vertically or horizontally stretched cards may be horizontally or vertically arranged in rows or columns or may be placed in swim lanes, filmstrips, carousels, and so on, without departing from the scope of the present teachings.

The card display controller 46 may communicate with the metric computing module 24 to determine, for example, how to calculate and/or weight values, i.e., metrics (in view of the resource request) to be displayed via one or more graphics. For example, in the present embodiment, the qualification scoring module 38 includes computer code for calculating an overall qualification score based on competency values, proficiency scores, and keyword scores in accordance with an algorithm implemented via the computer code.

For the purposes of the present discussion, a keyword may be any word or phrase which may occur in a profile or other computing object associated with a resource (e.g., a resource's resume, biography, description, work summary, etc.), wherein the word or phrase is used in a search or query of a database containing profiles or other computing objects associated with one or more resources.

The competencies module 40 may store values associated with qualifications for a particular resource being analyzed. For example, a qualification value for a particular resource may be 0 if the resource does not exhibit the qualification, and 1 if the resource exhibits the qualification. For the purposes of the present discussion, the terms 'qualification' and 'competency' may be employed interchangeably herein and may refer to a resource's ability to perform one or more tasks or roles indicated by a resource request. For example, a resource that is considered qualified to program in Java Beans 4.0 and is qualified to work with PeopleSoft Financials 8.9 is said to have or exhibit a Java Beans 4.0 qualification or competency and PeopleSoft Financials 8.9 qualification or competency.

Different examples of computing a qualification score are provided below. Other ways of computing a qualification score are possible even though they may not be described herein. In general, qualification scoring can include any manner of assigning, computing, or otherwise obtaining values or components used to generate a score.

In a particular embodiment, competency component values are assigned depending on whether a request for a resource includes a competency requirement and an optional proficiency level. For example, if a resource is required to be competent in a specific computer language, and further required to be "highly" competent in that specific computer language, then any resource that meets both the competency and proficiency is assigned a value of 1 for the competency component. If the competency requirement is met but the proficiency level is not met, then the competency component value is assigned 0.5. If the competency requirement is not present at all in the resource, then the competency component value is assigned 0. If the proficiency level requirement is not specified in the request, then the competency component value is assigned a 1 or a 0 depending upon whether the resource being considered has the competency or does not have the competency, respectively, regardless of any proficiency level associated with the resource's competency.

Each qualification or competency may be associated with a proficiency value, such as expert, advanced, intermediate, or not proficient (e.g., novice). Each proficiency may be associated with a proficiency metric or value. In the present specific embodiment; for the purposes of calculating an overall qualification score, expert, advanced, and intermediate proficiencies may be assigned a value of 0.5, and otherwise 0. The proficiencies module 42 may store proficiency values associated with qualifications of a resource being analyzed.

The keywords module 44 includes computer code for calculating a keyword score for a resource being analyzed for inclusion among search results. To calculate a keyword score, instances of keywords appearing in a resource profile being analyzed are counted and then divided by the highest number of instances of the same keyword found among all other resource profiles being simultaneously analyzed or searched. Hence, the keyword score represents a percentage of the maximum of keywords found among all searched resource profiles. For the purposes of the present discussion, a resource profile may be any computing object, such as a database record, table, file, and so on, associated with or otherwise representing a particular resource.

To calculate an overall qualification score for a particular resource, the qualification scoring module 38 first employs qualification information and any associated proficiency information from the competencies module 40 and proficiencies module 42, respectively, to determine a competency component, also called a structured qualifications score. The qualification scoring module 38 also retrieves a keyword component, i.e., keyword score, from the keywords module 44. The competency component and the key word component are then averaged by the qualification scoring module 38 to yield the overall qualification score, also called the total qualification score.

Exact details of methods for calculating a qualification score are implementation specific and may vary, without departing from the scope of the present teachings. An example method for calculating a qualification score is discussed more fully in the U.S. Patent Application entitled PROJECT RESOURCE QUALIFICATION AND KEYWORD SCORING, referenced above.

Note that the metric computing module 24 may include additional modules and functionality other than that represented by the qualification scoring module 38 and associated competencies module 40, proficiencies module 42, and keywords module 44. For example, the metric computing module 24 may include computer code for determining an availability score based on availability data and time data associated with a retrieved search result. For example, a resource request may indicate that a resource is needed for six weeks starting one month from now. A resource that has more available time during the six week interval may be assigned a higher availability score.

For the purposes of the present discussion, an overall score, also called a total score, may be any number or metric that incorporates, in a calculation of the metric, plural metrics describing or characterizing a person or other resource. Examples of the plural metrics that may be incorporated into an overall score include a qualification score and a keyword score.

While the overall qualification score computed by the qualification scoring module 38 and associated modules 40-44 is discussed as incorporating a structured qualification score component and a keyword component, note that other components may be incorporated into an overall score without departing from the scope of the present teachings. For example, in certain implementations, an available capacity score may be incorporated as a component of the overall score. An available capacity score may be any metric or number the represents a measurement of a person's or other resource's availability for performing one or more tasks or roles indicated in a resource request. A resource request may include any collection of data or criteria describing one or more characteristics of a resource.

The filtering module 26, sorting module 28, card generator 30, graphic indicator module 32, comparing module 34, and action module 36, include computer code for facilitating filtering search results, sorting search results, displaying search results via cards, presenting graphical indicators in the cards, and performing actions on or pertaining to cards appearing in the search results, respectively.

In particular, the filtering module 26 includes computer code for facilitating implementing filtering functions in response to user input to the user interface software 20. The filtering functions are used to filter search results, i.e., computing objects associated with resources matching a resource request, based on certain filtering criteria. Examples of filtering criteria include competencies of the resource, location, roles, travel preferences, qualification score ranges, availability capacity score ranges, and so on, as discussed more fully below.

The sorting module 28 includes computer code for facilitating sorting results, i.e., computing objects, such as database records, representing one or more resources meeting parameters set forth via a resource request. Results may be sorted, for example, by qualification score, available capacity score, overall score, and so on. Other sorting options, such as an option to sort by resource location proximity to a predetermined location, may be provided without departing from the scope of the present teachings. Furthermore, various sorting options are implementation specific and may be omitted or included in a particular implementation without departing from the scope of the present teachings.

The card generator 30 includes computer code for facilitating arranging data pertaining to retrieved resource results into electronic cards for display via the user interface software 20 and hardware 22.

The graphic indicator module 32 includes computer code for facilitating generating instructions for rendering graphics, such as graphical indicators presented in the cards, for display via the user interface software 20 and hardware 22.

For the purposes of the present discussion, a graphic, also called a visual display element or a graphical display element, may be any icon, visualization, window, dialog box, or other graphical or visual representation of a computing object or metric, where the visual representation may be presented on a display screen, projected, or otherwise displayed. Additional examples of graphics include color coded indicators, pictures, charts (or portions thereof), graphs, visualizations (e.g., sunburst visualizations), and so on.

In the present example embodiment, metrics, such as available capacity scores and qualification scores are illustrated via indicators. An indicator may be any graphic employed to illustrate a value or metric.

The comparing module 34 includes computer code for comparing resource results based on predetermined comparison parameters. Examples of comparison parameters include qualification scores, available capacity scores, and overall scores. For example, resource search results may be compared based on all data present in or otherwise associated with a given card. Results of the comparison may be displayed via a visualization, ranked list, chart, scatter plot, and so on. Exact methods for displaying results of a comparison operation are implementation specific and may vary depending upon the needs of a given implementation.

The action module 36 includes computer code for facilitating implementing an action pertaining to one or more resource results in response to user input provided via the user interface software 20 and hardware 22. Examples of actions include adding a resource result to a shortlist or other pool of resources; assigning a resource to a particular department or project, contacting a particular resource via email, and so on. The exact types of actions and associated user options provided by the system 10 are implementation specific and may vary accordingly.

The card display controller 46 includes software for interfacing the user interface software 20 with functionality provided by the modules 24-36. The card display controller 46 communicates with and incorporates inputs from the modules 24-36 for facilitating rendering a display of cards (representing search results, i.e., resources) via the user interface software 20 and hardware 22.

While various modules of the system 10 are shown as separate modules, certain modules may be incorporated into other modules or may be separated from other modules, without departing from the scope of the present teachings. For example, the resource search and display module 12 may be integrated with the user interface software 20, and the user interface software 20 may be incorporated as part of the HR database software 16.

In general, the various modules of the system 10, such as modules 22-36 of the resource search and display module 12, may be implemented via one or more computer functions, procedures, routine libraries, and so on, and the functionality may be distributed among resources of a network or consolidated into a single module, without departing from the scope of the present teachings. Similarly, the various modules of the system 10 may be implemented via a single computer or multiple computers distributed over a network, without departing from the scope of the present teachings.

Figure 2:
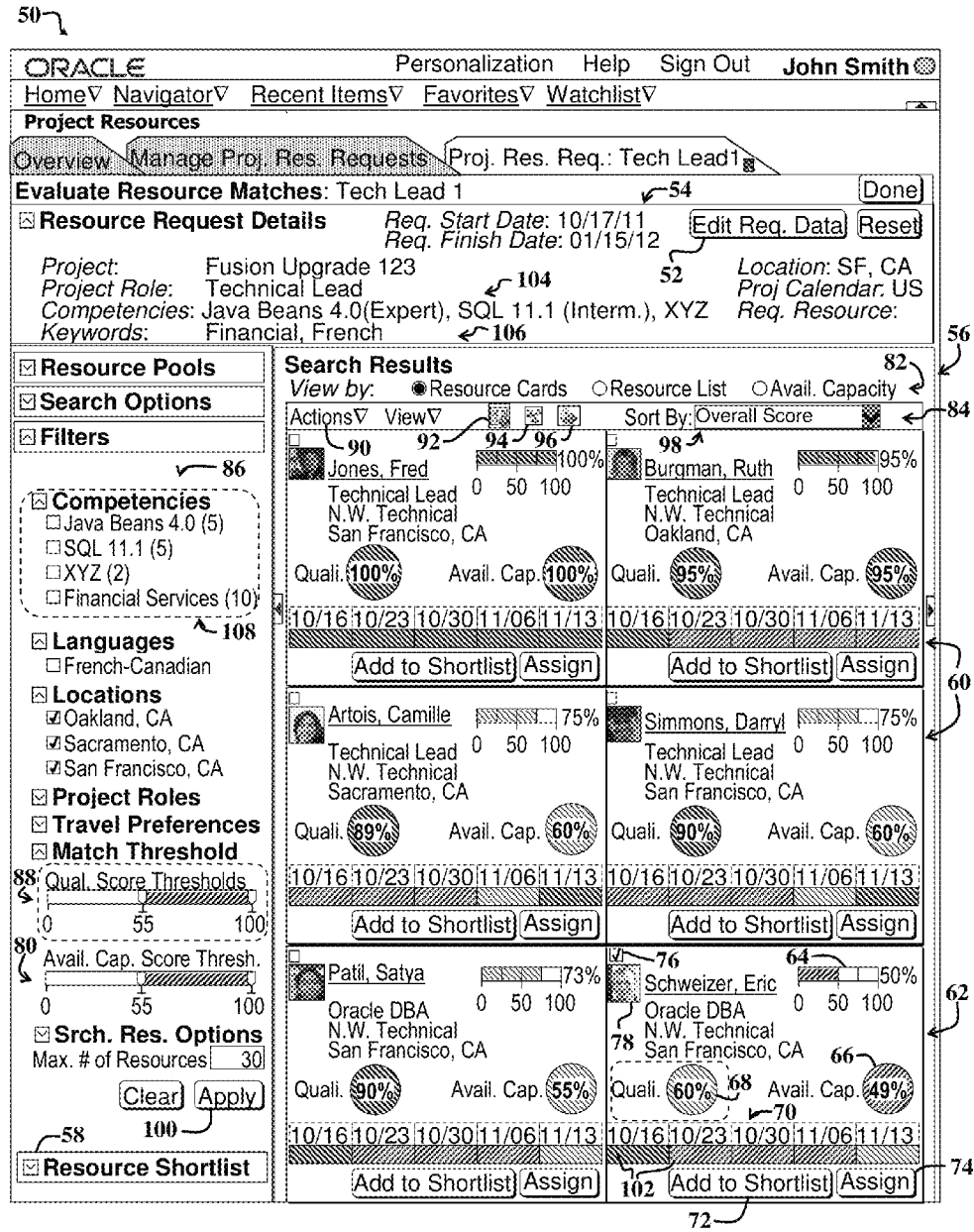
FIG. 2 is a first example user interface display screen adapted for use with the system of FIG. 1 and illustrating example search results and accompanying mechanisms for selectively adding search result to a shortlist and for initiating comparison operations between selected resources of the search results.

FIG. 2 is a first example user interface display screen 50, called the card view, which adapted for use with the system of FIG. 1. The example display screen 50 illustrates example search results 56 and accompanying mechanisms 76, 72 for selectively adding a search result to a shortlist 58 and for initiating comparison operations 94 between selected resources of the search results 56.

The first example user interface display screen 50 further illustrates the example search results 56 (via various cards 60) and accompanying qualification scores (via qualifications graphics 68), score components (e.g., pertaining to requested competencies 86, 104 and keywords 106), and score thresholds 88.

The user interface display screen 50 includes a resource request details section 54, which shows various details of an example resource request, such as project name, start date, finish date, location, requested competencies (i.e., qualifications), and so on. The resource request details include example specifications of various requested competencies 104 and keywords 106. When profiles of candidate resources are searched, the specified competencies 104 (and proficiency values indicated in parenthesis) and keywords 106 are employed, e.g., by the resource search and display module 12 of FIG. 1, to calculate qualification scores. Qualifications scores of resource search results, also called match results, are graphically displayed in cards 60 via qualifications graphics 68. User selection of an edit button 52 may trigger opening of another window or dialog box, where a user may adjust the resource request details, also called query parameters, search criteria, or resource request criteria.

The qualifications graphics 68 are color coded or otherwise visually coded, such as by shading, outlining, and so on. The qualifications graphics 68 indicate a calculated qualification score for each search result, e.g., as calculated via the qualification scoring module 28 of FIG. 1. An example color scheme for color coding a qualifications score graphic may include red, green, and blue colors to indicate how well a resource matches the requested qualifications 104 and keywords 106 specified in the resource request details 54. For example, a green circle may indicate a resource with a qualification score of 80% or higher; a yellow circle may indicate a resource with a qualification score between 50-79%, and a red circle may indicate a resource with a qualification score between 0-49%.

Requested qualifications found among search results 60 indicated in the search results section 56 may be indicated in a competencies sub-section 108 of a filter section 86 to the left of the search results section 56. The number of found resources that have a particular qualification may be indicated adjacent to qualifications, i.e., competencies, listed in the competencies section 108 (shown in parenthesis). Alternatively, or in addition, numbers adjacent to a listed competency in the competencies sub-section 108 may include a count of instances of keywords found in resource profile descriptions of competencies. For example, the keyword "Financial" was requested (e.g., as shown in the keywords 106). The match engine (e.g., resource search and display module 12 of FIG. 1) found 10 resource search results with a qualification containing the term "Financial." Accordingly, a count of 10 is indicated adjacent to the "Financial Services" qualification in the competencies sub-section 108.

For the purposes of the present discussion, a profile may be any computing object associated with a human resource. A computing object may be any collection of data and/or functionality. For example, an example human resource profile may store, e.g., via a database record and/or other computing object, all enterprise data and calculations known about a human resource.

A qualification score slider 88 provides a user option to customize or filter search results (represented by cards 60) displayed in the search results section 56 according to a user specified range of qualification scores, as discussed more fully below.

The search results section 56 includes various user interface controls 82, 84 for manipulating the displayed results, i.e., cards 60. For example, radio buttons 82 provide user options to display search results as cards, via a resource list (e.g., a table), or via an ordered listing or card arrangement according to available capacity of a person (human resource) associated with a card. Additional radio buttons may provide additional options, such as for cascading the cards 60 or for arranging the tiled cards 60 into a filmstrip view, without departing from the scope of the present teachings.

A tool bar 84 includes an actions drop down menu 90, a shortlist button 92, a compare button 94, an assign button 96, and a sort drop down list 98. The various user interface controls of the toolbar 84 may be used to manipulate selected cards. The cards 60 may be selected by checking a checkbox 76 included in each of the cards.

For example, to implement a compare operation (also called a comparison operation) comparing different cards, a user (e.g., resource manager) may first select each checkbox 76 for the cards that the user wishes to compare. The user may then select the compare button 94. Similarly, to add certain cards to a shortlist 58, a user may select cards by checking one or more of the checkboxes 76, and then clicking the shortlist button 92. The shortlist button 92 and checkboxes 76 together represent a type of shortlist user interface control. A shortlist user interface control may be any user interface control that is adapted to enable a user to add a resource or representation thereof to a shortlist.

Each example card 60 also includes a picture 78, an overall score graphic 64, a qualifications graphic 68, an available capacity graphic 66, and a five-week availability indicator 70. The graphic indicators 64-70 are color coded or otherwise visually coded. For the purposes of the present discussion, a visually coded graphic or indicator may be any user interface element whose appearance has been adjusted in accordance with a scheme. For example, the color of a graphic may be adjusted to represent different ranges of values. Note that coding other than color coding may be employed. For example, shapes and/or sizes of graphics may be adjusted in accordance with different values or ranges of values associated with a given metric.

The five-week availability indicator 70 represents a graphic illustrating a resource's availability for a five week period. In the present example embodiment, the five week period corresponds to weeks within or near a start date and completion date of a project for which a resource is sought, as indicated in the example resource request details section 54.

The five-week availability indicator 70 includes plural sections 102 that correspond to weeks within a predetermined five week interval. Each section 102 is color coded or otherwise visually coded to convey or indicate an availability score corresponding the section. An available capacity score illustrated via the available capacity indicator 66 may represent a combination of the availability scores for the various sections 102 of the five-week availability indicator 70. Note that time periods other than five weeks, and partitions other than weekly partitions, may be employed in an availability indicator without departing from the scope of the present teachings. The five-week availability indicator 70 enables a resource manager to determine when a resource may become available and to make decisions accordingly.

For selected resources (e.g., which have been selected by checking one or more of the check boxes 76), additional data, including resource availability data (such as details of a particular resource's schedule), may be obtained via a comparison view. The comparison view may appear after user selection of the compare button 94 or after user selection of another compare button from the shortlist 58, as discussed more fully below.

Additional buttons 72, 74 for adding a card to a shortlist and for assigning a resource associated with a particular card to a project are also included. The search results section 56 may include different, additional, or fewer user interface controls than those shown, without departing from the scope of the present teachings.

The example filtering section 86 provides various user interface controls for filtering which cards 60 are displayed via the display section 56. For example, the displayed cards may be filtered by competencies, languages spoken, location, project role, travel preferences, and so on. Various filtering criteria may be employed by checking a box adjacent to the filtering criteria.

In the present example embodiment, checking a box next to an element of the filters 86 may cause inclusion of only resources characterized by the selected element. Selection of simultaneous filtering elements may cause inclusion of only resources characterized by one or more of the selected elements. Alternatively, only cards of resources that are described by both elements are then shown. Alternatively, selected filtering elements cause exclusion of cards corresponding to resources described by the selected filtering elements. Exact filter behaviors and provided filtering options are implementation specific and may vary between implementations, without departing from the scope of the present teachings.

In the present example embodiment, the filter section 86 further includes the qualification score slider 88 and an available capacity score slider 80. The sliders 88, 80 include movable tabs, also called bars, for enabling a user to specify ranges, also called regions, for a qualification score and an available capacity score. The regions represent ranges within which the qualification score and availability capacity score of a resource must land to be included among filtered search results, i.e., cards 60, displayed in the search results section 56. After a user has checked specific filtering criteria and/or adjusted the slider bars 88, 80, a user may apply the filtering criteria by selecting an apply button 100.

The sliders 88, 80 represent examples of slider user interface controls. For the purposes of the present discussion, a slider user interface control may be any user interface control with a graphic that can be positioned or moved to change values corresponding to positions of the graphic. A slider bar may be any movable graphic of a slider user interface control.

Pictures 78 and/or other components of the cards 60 may be hyperlinked such that selection thereof may cause display of another window or dialog box with additional details of an associated human resource. Functionality for viewing additional details of a resource associated with a card is called drill down functionality herein. Such drill down functionality may be further accessible via a user option provided via the actions drop down menu 90 or other mechanism.

Exact additional details displayed in response to selection of a hyperlinked picture, a hyperlinked name of a card, or a details item in a drop down menu, are implementation specific. Examples of additional details that may be shown include indications of knowledge areas, languages spoken, competencies or knowledge areas, salary, and so on.

Hence, the example user interface display screen 50 may be considered a resource management user interface display screen, wherein search results obtained in response to a resource request are displayed in cards 60, and wherein each card 60 has one or more graphics 64-70.

FIG. 3 is a second example user interface display screen 120, which is adapted to facilitate managing resource requests and viewing shortlists associated therewith. The second user interface display screen 120 may be accessed by selecting a Manage Project Resource Requests tab of the first user interface display screen 50 of FIG. 1.

The display screen 120 includes resource request search section 122, which includes various search fields 124, whereby a user may enter search terms and parameters to search for previously specified resource requests.

A search results section 126 identifies various example resource requests that have been returned in response to initiation of a search via the resource request search section 122. The resource requests of the search results section 126 will match search criteria previously entered via the search fields 124.

In the present example embodiment, when a user highlights a resource request in the search results section 126, a corresponding, i.e., associated shortlist 58 appears. In the present specific embodiment, the shortlist 58 may be expanded or collapsed. The exact position of the resource shortlist 58 in the user interface display screen 120 is implementation specific. An example positioning of the shortlist 58 is in the upper right portion of the display screen 120.

By default, the resource shortlist 58 is associated with a resource request that produced resource search results from which all (or a majority) of the resources in the shortlist 58 were chosen. Note that while only one shortlist 58 is shown for "Tech Lead 1" that additional shortlists may be implemented and included, without departing from the scope of the present teachings. In addition, a user option may be provided for associating a resource shortlist with another resource request. Furthermore, an additional user option may be added to enable a user to manually add or otherwise add a user specified resource to a particular shortlist.

For illustrative purposes, a resource request qualification and keywords information section 128 appears or is otherwise populated with data pertaining to a resource request when the resource request is user selected from among the search results 126. Example data pertaining to the resource request includes the name of the request, competencies requested, keyword search criteria, requested language(s), and/or other search criteria associated with the resource request "Tech Lead 1." A user may employ a computer mouse or other selection mechanisms or methods to select resource requests from the results list 126.

Figure 4:
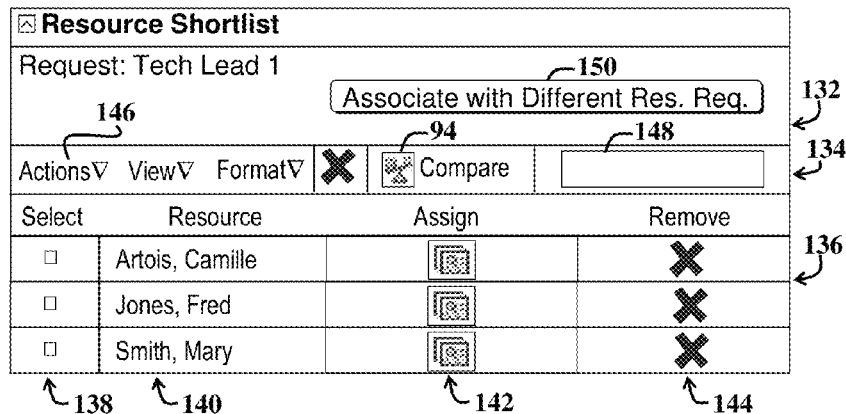
FIG. 4 is a third example user interface display screen illustrating an example shortlist and accompanying options for initiating comparison operations between selected resources of the shortlist.

FIG. 4 is a third example user interface display screen 58 illustrating an example shortlist 58 and accompanying options 94, 138 for initiating comparison operations between selected resources of the shortlist 58.

For the purposes of the present discussion, a shortlist may be any collection of resources or representations thereof that represents a subset of a larger collection of resources. A shortlist may be displayed, at least in part, in a region of a display screen, such as via a list, a series of cards, a collection of graphical representations, and so on. A shortlist may represent user-chosen resources, i.e., resources that have been shortlisted in response to user input provided to underlying software used to display representations of the resources.

In general, a shortlist may be populated, for example, by user selections made from among resource request search results or from other types of resource searches. Alternatively, in certain implementations, a shortlist may be automatically populated based on user chosen or implementation specific criteria. For example, in an alternative implementation, additional filtering criteria may be applied to search results obtained in response to initiation of a resource request, yielding filtered search results. The filtered search results may then automatically populate a predetermined shortlist. Exact shortlist details and functionality may vary depending upon the implementation, without departing from the scope of the present teachings.

The example shortlist 58 includes a header section 132, which identifies the shortlist by name, e.g., "Tech Lead 1." A control section 134 provides various user interface controls, including an actions menu 146, a compare button 94, and a search field 148.

A list section 136 includes a listing identifying various resources that have been shortlisted. The list section 136 includes a checkbox column 138, a resource name column 140, an assign column 142, and a remove column 144. The checkbox column 138 provides selection mechanisms, e.g., checkboxes, for enabling a user to select one or more resources from the list section 136 for which to perform actions on. Example actions include assigning a selected resource to a particular project associated with a resource request, e.g., via user selection of an assign button from among icons in the assign column 142; removing a selected resource from the list section 136, e.g., by selecting a remove button from the remove column 144 or via a remove button in the control section 134.

Note that actions menu 146 may provide similar and/or additional user options (e.g., similar to actions provided via the check boxes 138, assign buttons 142, and remove buttons 144) for performing actions pertaining to various selected resources from the list section 136 or for performing other shortlist-related actions. For example, the actions menu 146 may include a user option to add a new resource to the shortlist; to associate the shortlist 58 with a different resource request or project, to drill down into additional details associated with a selected resource, and so on. For the purposes of the present discussion, a shortlist selection mechanism may be any user interface control that is adapted to enable a user to make a selection of an item, such as a human resource or representation thereof, from among one or more available selections. Example shortlist selection mechanisms include the checkboxes 138 associated with adjacent resource representations, e.g., rows of the list section 136, the various tiled cards 60 of FIG. 2, and so on.

Note that the shortlist 58 includes an additional associate option 150 to associate the shortlist 58 with a different resource request. User selection of the associate option 150 may trigger display of an additional display screen with additional user options to select a resource request or other computing object with which to associate the shortlist 58.

In the present example embodiment, when a user selects one or more resources from the list section 136, e.g., via checking one or more of the checkboxes 138, an additional dialog box may appear with options for triggering assignment of one or more selected resources to a particular position, e.g., to a particular project, corporate role, task, and so on. The additional dialog box or display screen may further include user options to remove a job or position assignment associated with a particular resource. However, in certain implementations, by default, selection of one of the assign buttons 142 corresponding to a selected resource may cause the resource to be assigned to a position associated with the resource request (e.g., Tech Lead) that is associated with the shortlist 58.

If a user, such as a project manager or HR manager wishes to obtain additional information about particular resources and/or to compare various attributes, i.e., characteristics associated with resources, then plural resources may selected from the list section 136, e.g., by checking plural of the checkboxes 138. Subsequently, a user may select the compare button 94 to trigger a comparison operation, which then results in display of a comparison view, as discussed more fully below.

For the purposes of the present discussion, a comparison may be any juxtaposition of data to be compared. A comparison operation may be any operation or function that acts to juxtapose data to be compared. A juxtaposition may include any simultaneous presentation of or illustration of data to be compared. A juxtaposition may also include a combination of data to be displayed, where the combination shows or illustrates a difference or contrast between the data to be compared. A comparison view may be any user interface display screen that illustrates data for multiple resources to facilitate juxtaposition or comparison of the data.

FIG. 5 is a fourth example user interface display screen 160 illustrating an example comparison view section 164 that juxtaposes example resource information pertaining to various compared resources. The user interface display screen 160 represents a comparison view, which may be displayed in response to user selection of the compare buttons 94 of FIG. 2 or FIG. 4 after resource selections are made via the checkboxes 76, 138 of FIG. 2 or 4.

The fourth example user interface display screen 160 includes a resource request details section 162, the comparison view section 164, and various expandable sections 224, 226, 228, including a requested qualification section 224, a requested keywords section 226, and a resource schedule section 228. The display screen 160 further includes a resource actions drop down menu 166, which includes various user options, e.g., a user option to assign a selected resource to a position (e.g., a project role, job position, and so on), a user option to add a selected resource (e.g., selected via a checkbox 76) to a particular shortlist, a user option to remove a selected resource from a shortlist, an option to add a resource to a comparison operation, and so on.

The resource request details section 162, which is not expanded in FIG. 5, may be expanded to show data identifying a particular resource request, including requested start date, end date, and so on. The resource request details section 162 may be similar to the details section 54 of FIG. 2 or may include additional or less data, depending upon the needs of a given implementation.

The resource information section 164 includes various columns for each resource being compared, e.g., a Fred Jones column 168, a Mary Smith column 170, and a Camille Artois column 172. Each of the columns 168-170 contains data provided in rows in accordance with items indicated in an attribute column, also called a resource information column 200. For example, job title, resource calendar, project role, location, cost rate, bill rate, overall match score, qualification match score, and available capacity information are indicated in the attribute column 200. A value for each attribute is specified for each compared resource in the columns 168-172.

The comparison view section 164 further includes graphical indicators 174 in each column 168-172, which indicate values for each resource's overall match score, qualification match score, and available capacity score. By providing data, including graphical indicators, in a side-by-side format for each compared resource, a user may quickly ascertain differences between resources that may be relevant to HR decisions, such as decisions pertaining to position assignments, pay raises, and so on.

FIG. 6 is a fifth example user interface display screen 180 illustrating an example qualification comparison view section 224 that juxtaposes qualification ratings, also called proficiency levels (e.g., expert, intermediate, superior, medium, and nonexistent), pertaining to various example requested resource qualifications (e.g., Java Beans 4.0, SQL 11.1, and XYZ). The qualification comparison view section 224**may be accessed by expanding the requested qualification section 224 of FIG. 5.

The qualification comparison view section 224 includes various columns 182-186 with qualification information, i.e., proficiency levels, for each resource being compared and for various requested qualifications identified in a qualification column 202. For example, a Fred Jones column 182 indicates that Fed Jones is an expert at the requested qualifications Java Beans 4.0 and SQL 11.1; is rated as intermediate at XYZ; has medium French language writing skills, and has medium ABC skills.

Note that the qualification column 202 indicates qualifications that were requested in an associated resource request, e.g., the resource request specified in the resource request details section 162 of FIG. 5. In addition, requested proficiency levels associated with each requested qualification are indicated in the qualification column 202. For example, the resource request "Tech Lead 1" requests that resources for a particular project be rated as having expert proficiency at working with Java Beans 4.0, as indicated in parenthesis adjacent to the identification of the qualification in the qualification column 202.

Various symbols 176, such as check, check-plus, check-minus, and so on, may be employed to graphically indicate, in each field of the columns 182-186, whether a resource's proficiency level matches, exceeds, or is less than the requested proficiency level for the indicated qualification or competency.

The qualification comparison view section 224 further includes a control bar 188 with various user options, e.g., as provided via one or more menus, buttons, and/or other user interface controls, for adjusting the qualification comparison view section 224.

Figure 7:
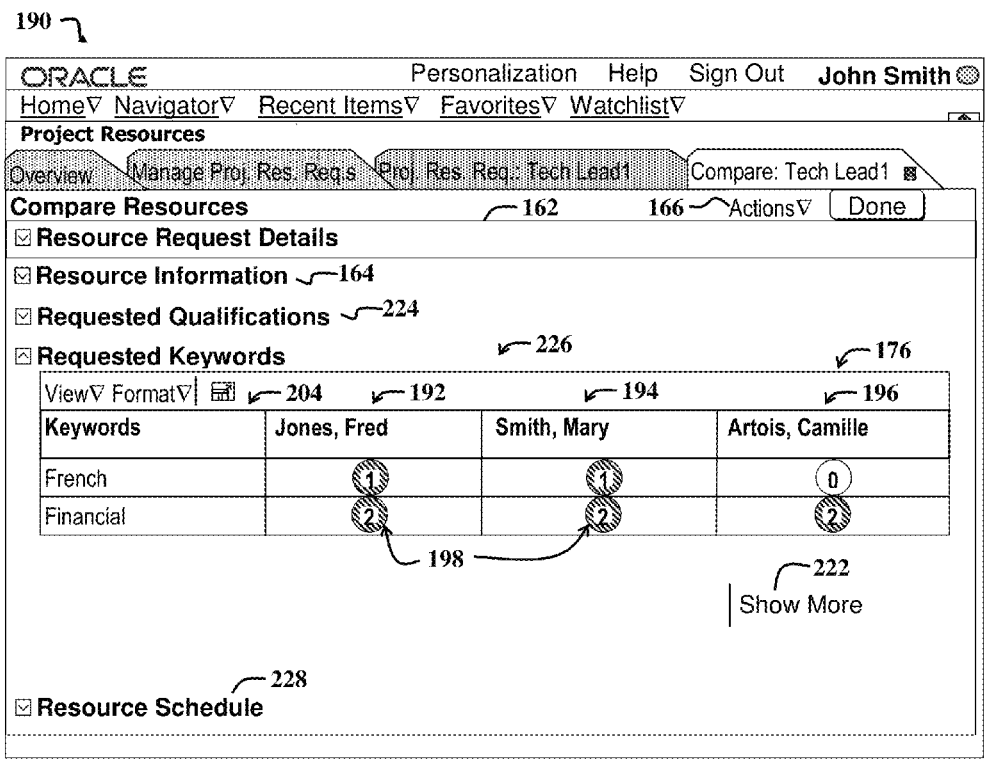
FIG. 7 is a sixth example user interface display screen illustrating an example comparison that juxtaposes information pertaining to requested keyword matches occurring in profiles associated with compared resources.

FIG. 7 is a sixth example user interface display screen 190 illustrating an example keyword comparison view section 226 that juxtaposes information pertaining to requested keyword matches occurring in profiles associated with compared resources, e.g., Fred Jones, Mary Smith, and Camille Artois.

The keyword comparison view section 226 includes columns 182-186 for each of the compared resources. The columns 182-186 include fields with various color-coded graphical keyword match symbols 198, which covey information pertaining to the number of matches for a requested keyword that occur in each profile of the resources being compared. Requested keywords, i.e., French and Financial, are indicated in a keyword column 204.

For example, Fred Jones is indicated as having a profile that includes one instance of the keyword "French" and two instances of the keyword "Financial." Note that the various keyword match symbols 198 may be color coded via a color gradient (e.g., that varies from red to green) that varies in accordance with keyword match score, i.e., the number of keyword matches for a particular keyword appearing in a profile of a compared resource.

For the purposes of the present discussion, a keyword match score may be any metric or value representative of a number of keywords occurring in a profile or portion thereof of a resource or representation thereof.

Figure 8:
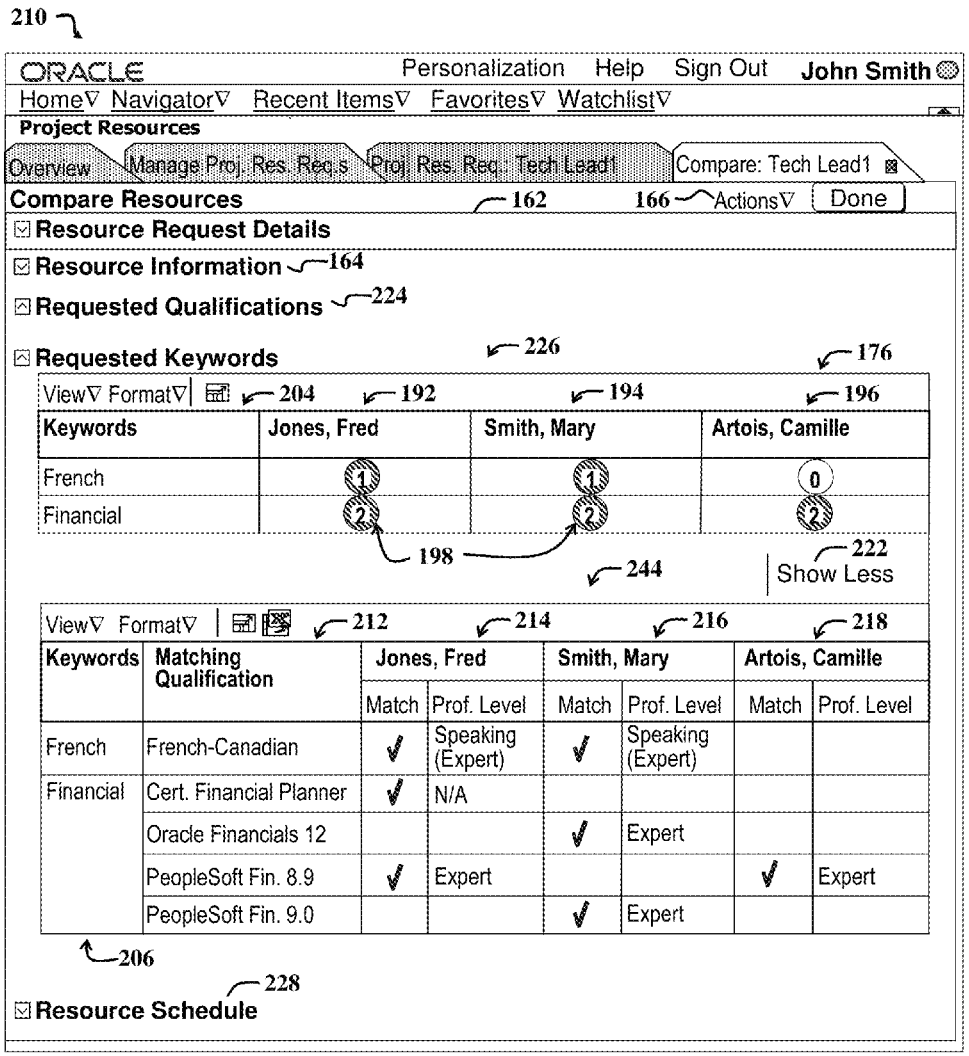
FIG. 8 is a seventh example user interface display screen illustrating an example comparison that juxtaposes additional keyword match details pertaining to keyword matches occurring in profiles associated with compared resources.

FIG. 8 shows a seventh example user interface display screen 210, which illustrates an example keyword details comparison view section 244. The keyword details comparison view section 224 juxtaposes, i.e., compares, additional keyword match details pertaining to keyword matches occurring in profiles associated with compared resources.

The keyword details comparison view section 244 includes columns 214-218 detailing information about each qualification section of a profile of a compared resource that is associated with match of a requested keyword. The requested keywords, as shown in a requested keyword column 206, are similar to those shown in the keyword column 204. Qualification sections associated with a match of a particular keyword are identified in a matching qualification column 212.

The resource columns 214-218 include indicators or specifications associated with each matching qualification listed in the matching qualification column 212. The indicators may include, for example, check marks in fields indicating whether a resource is characterized by qualification that matches a requested qualification that is associated with a requested keyword.

For example, with reference to the Fred Jones column 214, the keyword "Financial" occurs in a French-Canadian qualification section of a profile associated with the resource Fred Jones. A check mark in the Fred Jones column 214 adjacent to the French-Canadian qualification of the matching qualification column 212 indicates that Fred Jones is characterized by a French-Canadian qualification (and proficiency level) matching a language qualification and associated proficiency level of an associated resource request. Note that the Fred Jones column 214 indicates that Fred Jones is an expert at speaking French-Canadian.

Similarly, the keyword "Financial" occurs in sections of Fred Jones's profile corresponding to various qualifications, including Certified Financial Planner and PeopleSoft Financials 8.9. The Fred Jones Column 214 indicates, e.g., via a checkmark, that a Certified Financial Planner qualification and a PeopleSoft Financials 8.9 qualification characterizing Fred Jones meets criteria specified in an associated resource request. The Fred Jones column 214 further indicates that Fred Jones is characterized by an expert proficiency level at working with PeopleSoft Financials 8.9.

Similarly, the Mary Smith column 216 and the Camille Artois column 218 include fields indicating information about certain qualifications or profile qualification sections that include one or more words that match one or more requested keywords of the requested keywords column 206.

Hence, the requested keyword comparison view section 226 and accompanying detailed section 244 not only facilitate comparing numbers of matches of keywords existing in profiles of resources being compared, but may facilitate comparing qualifications and any associated proficiency levels of resources, and particularly qualifications and proficiency levels that are associated with sections that include one or more words that match requested keywords.

Note that display of the keyword details comparison view section 244 may be triggered or collapsed by selecting a show more/less option 222 near the upper right portion of the keyword details comparison view section 244.

Figure 9:
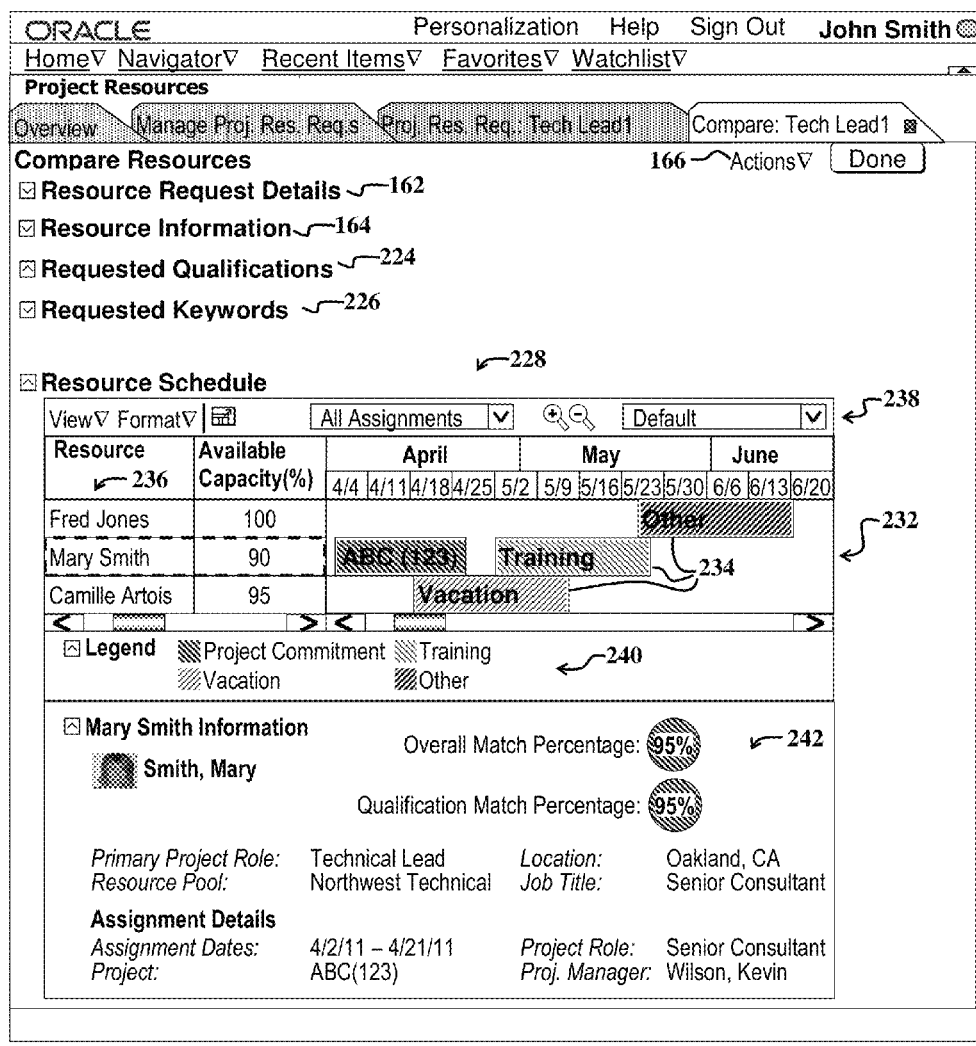
FIG. 9 is an eighth example user interface display screen illustrating an example comparison that juxtaposes schedules associated with compared resources.

FIG. 9 is an eighth example user interface display screen 230 illustrating an example resource schedule view section 228, which juxtaposes schedules associated with compared resources indicated in rows of a resource column 236.

The resource schedule view section 228 includes a Gantt chart section 232 with various horizontal bars 234, which indicate which dates a particular resource identified in a resource column 236 is occupied. The bars 234 are coded, e.g., in accordance with a legend 240, to indicate what assignment, task, or other activity is represented by each bar 234. For example, Camille Artois is shown as being on vacation in the last half of April and the early part of May.

When a user selects a resource, e.g., Mary Smith, from the resource schedule view section 228, e.g., by employing a computer mouse to highlight an associated row, then additional information about the selected resource may automatically become accessible, as shown in an example selected resource information section 242. Examples of additional information include overall match score, qualification match score, project role, project name, and so on.

Additional user options for controlling or manipulating the resource schedule view section 228 are provided in a schedule control bar 238. Example user options include an option to filter assignments or activities (e.g., via a drop down menu) represented via the bars 234 of the Gantt chart 232. Currently, a user has selected to display all assignments or activities in the Gantt chart section 232.

Hence, the resource schedule view section 228 provides users, e.g., human resource managers, an efficient mechanism for comparing availability of resources for a particular project or task, e.g., the project or task associated with a resource request. A manager may readily determine, with reference to the resource schedule view section 228, whether a resource is currently working on a high or low priority project; whether the resource might be able to cancel a particular activity to participate in a given project, and so on.

Hence, the various user interface display screens of FIGS. 5-9 facilitate comparing or juxtaposing data and/or indicators beyond just data or indicators associated with qualifications of a particular resource request. Examples of additional data that may be compared include job title, project role; location; cost/bill rates; qualifications related to request; keyword matches in profiles of resources of search results based on requested/searched keywords; resource schedules, and so on.

In summary, various user interface display screens and accompanying methods discussed herein provide various comparison features and options, including, but not limited to, comparisons of qualifications that match keywords between selected resources; comparisons of schedules; options to drill down to determine what may be causing a resource to exhibit a low availability score; options to facilitate ascertaining relative flexibility of a resource's schedule, and so on.

Figure 10:
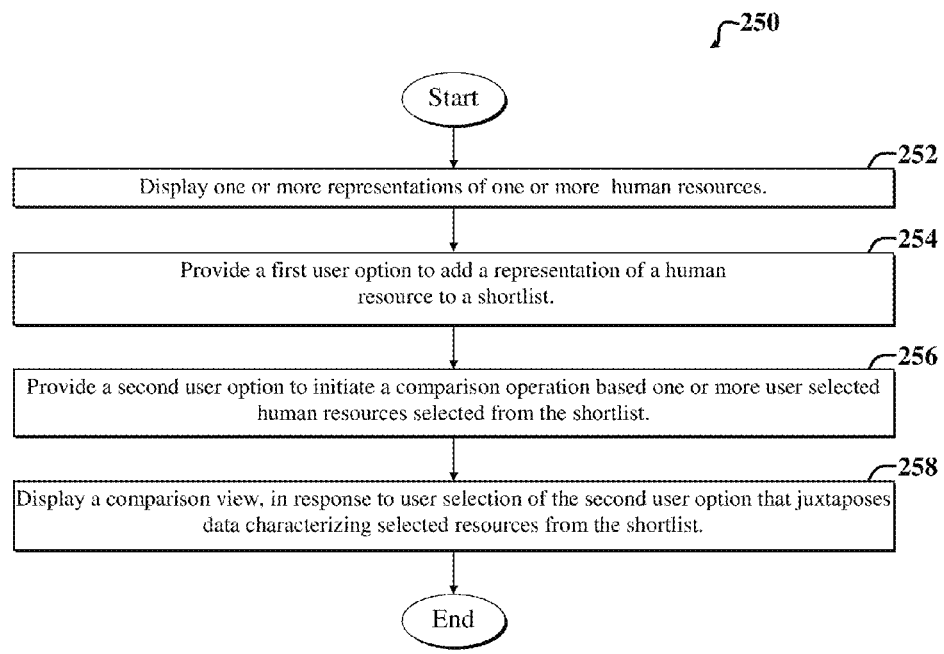
FIG. 10 is a flow diagram of a first example method adapted for use with the embodiments of FIGS. 1-9.

FIG. 10 is a flow diagram of an example method 250 adapted for use with the embodiments of FIGS. 1-9. The example method 250 includes a first step 252, which includes displaying one or more representations of one or more human resources. Examples of representations of human resources include the cards 60 of FIG. 2, columns 168-172 of FIG. 5, and so on.

A second step 254 includes providing a first user option to add a representation of a human resource to a shortlist.

A third step 256 includes providing a second user option to initiate a comparison operation based one or more user selected human resources selected from the shortlist A fourth step 258 includes displaying a comparison view, in response to user selection of the second user option, that juxtaposes data characterizing selected resources from the shortlist.

Note that the various steps 252-258 of the method 250 are illustrative and may vary, without departing from the scope of the present teachings. For example, the juxtaposed data in the fourth step 258 may include keyword information, and the fourth step 258 may further include displaying a comparison view juxtaposing proficiency levels associated with each qualification that is associated with a keyword match in a profile of a human resource being compared.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by one or more processors, for comparing qualifications of human resources in a plurality of human resources that meet a particular set of qualification criteria for a given project, task or role of an enterprise, the method comprising:

displaying, using the one or more processors, a first user interface having one or more of a resource information control, a requested competency proficiency control, a requested keywords control and a resource schedule control;

displaying, using the one or more processors and in response to input selecting the resource information control, a grid display comparing resource information of each human resource in the plurality of human resources;

displaying, using the one or more processors and in response to input selecting the requested competency proficiency control, a grid display comparing proficiency levels pertaining to competencies, included in the particular set of qualification criteria, of each human resource in the plurality of human resources;

displaying, using the one or more processors and in response to input selecting the requested keywords control, a grid display comparing numbers of keyword occurrences pertaining to requested keywords for each human resource in the plurality of human resources;

displaying, using the one or more processors and in response to input selecting the resource schedule control, a grid display comparing availabilities of each human resource in the plurality of human resources;

displaying information pertaining to a human resource in a card format;

displaying one or more shortlist selection controls in proximity to the card; and adding, in response to input to a shortlist selection control, a selected human resource to the shortlist.

2. A method, performed by one or more processors, for comparing qualifications of human resources in a plurality of human resources that meet a particular set of qualification criteria for a given project, task or role of an enterprise, the method comprising:

displaying, using the one or more processors, a first user interface having one or more of a resource information control, a requested competency proficiency control, a requested keywords control and a resource schedule control;

displaying, using the one or more processors and in response to input selecting the resource information control, a grid display comparing resource information of each human resource in the plurality of human resources and displaying a column, having at least two rows, for each human resource in the plurality of human resources, with one of said rows displaying an overall match of the human resource to the qualification criteria and another of said rows displaying an availability capacity of the human resource;

displaying, using the one or more processors and in response to input selecting the requested competency proficiency control, a grid display comparing proficiency levels pertaining to competencies, included in the particular set of qualification criteria, of each human resource in the plurality of human resources;

displaying, using the one or more processors and in response to input selecting the requested keywords control, a grid display comparing numbers of keyword occurrences pertaining to requested keywords for each human resource in the plurality of human resources; and displaying, using the one or more processors and in response to input selecting the resource schedule control, a grid display comparing availabilities of each human resource in the plurality of human resources.

3. A method, performed by one or more processors, for comparing qualifications of human resources in a plurality of human resources that meet a particular set of qualification criteria for a given project, task or role of an enterprise, the method comprising:

displaying, using the one or more processors, a first user interface having one or more of a resource information control, a requested competency proficiency control, a requested keywords control and a resource schedule control;

displaying, using the one or more processors and in response to input selecting the resource information control, a grid display comparing resource information of each human resource in the plurality of human resources;

displaying, using the one or more processors and in response to input selecting the requested competency proficiency control, a grid display comparing proficiency levels pertaining to competencies, included in the particular set of qualification criteria, of each human resource in the plurality of human resources and displaying a column, having at least two rows, for each human resource in the plurality of human resources, with a first row displaying a proficiency level of a first competency of the human resource and a second row displaying a proficiency level of a second competency of the human resource;

displaying, using the one or more processors and in response to input selecting the requested keywords control, a grid display comparing numbers of keyword occurrences pertaining to requested keywords for each human resource in the plurality of human resources; and displaying, using the one or more processors and in response to input selecting the resource schedule control, a grid display comparing availabilities of each human resource in the plurality of human resources.

4. A method, performed by one or more processors, for comparing qualifications of human resources in a plurality of human resources that meet a particular set of qualification criteria for a given project, task or role of an enterprise, the method comprising:

displaying, using the one or more processors, a first user interface having one or more of a resource information control, a requested competency proficiency control, a requested keywords control and a resource schedule control;

displaying, using the one or more processors and in response to input selecting the resource information control, a grid display comparing resource information of each human resource in the plurality of human resources;

displaying, using the one or more processors and in response to input selecting the requested competency proficiency control, a grid display comparing proficiency levels pertaining to competencies, included in the particular set of qualification criteria, of each human resource in the plurality of human resources;

displaying, using the one or more processors and in response to input selecting the requested keywords control, a grid display comparing numbers of keyword occurrences pertaining to requested keywords for each human resource in the plurality of human resources, displaying a row for each keyword being compared and column for a human resource in the plurality of human resources and displaying, in the column, the number of keyword occurrences, pertaining to the keyword, for each human resource;

displaying, using the one or more processors and in response to input selecting the resource schedule control, a grid display comparing availabilities of each human resource in the plurality of human resources.

5. A method, performed by one or more processors, for comparing qualifications of human resources in a plurality of human resources that meet a particular set of qualification criteria for a given project, task or role of an enterprise, the method comprising:

displaying, using the one or more processors, a first user interface having one or more of a resource information control, a requested competency proficiency control, a requested keywords control and a resource schedule control;

displaying, using the one or more processors and in response to input selecting the resource information control, a grid display comparing resource information of each human resource in the plurality of human resources;

displaying, using the one or more processors and in response to input selecting the requested competency proficiency control, a grid display comparing proficiency levels pertaining to competencies, included in the particular set of qualification criteria, of each human resource in the plurality of human resources;

displaying, using the one or more processors and in response to input selecting the requested keywords control, a grid display comparing numbers of keyword occurrences pertaining to requested keywords for each human resource in the plurality of human resources; and displaying, using the one or more processors and in response to input selecting the resource schedule control, a grid display comparing availabilities of each human resource in the plurality of human resources, displaying a row for each proficiency being compared, with each row representing one of the human resources in the plurality of human resources and with each row divided into time periods and indicating the time periods of availability of each human resource displaying a row for each proficiency being compared, with each row representing one of the human resources in the plurality of human resources and with each row divided into time periods and indicating the time periods of availability of each human resource.

6. An apparatus comprising:
a digital processor coupled to a display and to a processor-readable storage device, wherein the processor-readable storage device includes one or more instructions executable by the digital processor for comparing qualifications parameter human resources in a plurality of human resources that meet a particular set of qualification criteria for a given project, task or role of an enterprise, with the one or more instructions executable to perform the following acts:

displaying a first user interface having one or more of a resource information control, a requested qualifications control, a requested keywords control and a resource schedule control;

displaying, in response to user input selecting the resource information control, a grid display comparing resource information of each human resource in the plurality of human resources;

displaying, in response to user input selecting the requested competency proficiency control, a grid display comparing proficiency levels pertaining to competencies, included in the particular set of qualification criteria, of each human resource in the plurality of human resources and displaying a column, having at least two rows, for each human resource in the plurality of human resources, with a first row displaying a proficiency level of a first competency of the human resource and a second row displaying a proficiency level of a second competency of the human resource;

displaying, in response to user input selecting the requested keywords control, a grid display comparing numbers of keyword occurrences pertaining to requested keywords for each human resource in the plurality of human resources; and displaying, in response to user input selecting the resource schedule control, a grid display comparing availabilities of each human resource in the plurality of human resources.

7. A non-transitory computer readable storage medium including instructions executable by a digital processor for comparing qualification parameters of human resources in a plurality of human resources that meet a particular set of qualification criteria for a given project, task or role of an enterprise, with the one or more instructions executable, the non-transitory computer readable storage medium including one or more instructions for:

displaying a first user interface having one or more of a resource information control, a requested qualifications control, a requested keywords control and a resource schedule control;

displaying, in response to user input selecting the resource information control, a grid display comparing resource information of each human resource in the plurality of human resources;

displaying, in response to user input selecting the requested competency proficiency control, a grid display comparing proficiency levels pertaining to competencies, included in the particular set of qualification criteria, of each human resource in the plurality of human resources and displaying a column, having at least two rows, for each human resource in the plurality of human resources, with a first row displaying a proficiency level of a first competency of the human resource and a second row displaying a proficiency level of a second competency of the human resource;

displaying, in response to user input selecting the requested keywords control, a grid display comparing numbers of keyword occurrences pertaining to requested keywords for each human resource in the plurality of human resources; and displaying, in response to user input selecting the resource schedule control, a grid display comparing availabilities of each human resource in the plurality of human resources.

* * * * *

UNITED STATES PATENT AND TRADEMARK OFFICE
CERTIFICATE OF CORRECTION

| | | Page 1 of 1 |
|---|---|---|
| PATENT NO. | : 8,924,434 B2 | |
| APPLICATION NO. | : 13/538974 | |
| DATED | : December 30, 2014 | |
| INVENTOR(S) | : Leslie et al. | |

It is certified that error appears in the above-identified patent and that said Letters Patent is hereby corrected as shown below:

On the title page item (57), column 2, under Abstract, line 8, delete "based" and insert -- based on --, therefor.

In the Drawings,

On sheet 4 of 9, in figure 10, under Reference Numeral 256, line 1, delete "based" and insert -- based on --, therefor.

In the Specification,

In column 15, line 37, delete "224**may" and insert -- 224 may --, therefor.

In column 18, line 18, delete "shortlist" and insert -- shortlist. --, therefor.

Signed and Sealed this
First Day of September, 2015

Michelle K. Lee
*Director of the United States Patent and Trademark Office*